United States Patent [19]

Wing et al.

[11] Patent Number: 4,755,411
[45] Date of Patent: Jul. 5, 1988

[54] CUSHION HAVING FLEXIBLE OUTER MEMBRANE AND MULTI-DENSITY RESILIENT FOAM MEMBER THEREIN

[75] Inventors: William W. Wing, Menomonee Falls; Michael Van Dine, Dousman, both of Wis.

[73] Assignee: MILSCO Limited, Reno, Nev.

[21] Appl. No.: 41,160

[22] Filed: Apr. 22, 1987

[51] Int. Cl.$^4$ .................. A47C 5/00; A47C 27/14; B32B 5/14; B32B 5/20

[52] U.S. Cl. ................................ 428/71; 5/481; 297/455; 297/DIG. 1; 428/309.9; 428/316.6; 428/317.5

[58] Field of Search ............. 5/481; 297/455, DIG. 1; 428/71, 76, 309.9, 316.6, 317.5

[56] References Cited

U.S. PATENT DOCUMENTS

| | | | |
|---|---|---|---|
| 3,429,085 | 2/1969 | Stillman, Jr. | 428/316.6 |
| 3,833,259 | 9/1974 | Pershing | 428/316.6 |
| 4,190,697 | 2/1980 | Ahrens | 428/309.9 |
| 4,379,856 | 4/1983 | Samaritter et al. | 428/316.6 |
| 4,405,681 | 9/1983 | McEvoy | 428/309.9 |
| 4,476,183 | 10/1984 | Holtrop et al. | 428/316.6 |

*Primary Examiner*—William J. Van Balen
*Attorney, Agent, or Firm*—James E. Nilles; Thomas F. Kirby

[57] ABSTRACT

A cushion for motor vehicle seating or furniture comprises a flexible outer membrane or cover and a multi-hardness foam member, comprising foam regions of different foam hardness. The foam regions are bonded together along common boundaries and are bonded to the membrane at any boundary therewith, such bonding occurring during formulation of the foam member and employing the materials of which the foam member is made. The method generally comprises the steps of: (a) providing a flexible membrane having a cavity therein; (b) adding to the cavity in a predetermined sequence a plurality of formulations in liquid form which, when cured, provide a foam article having foam regions of different hardness; (c) and allowing the formulations to cure, bond together at any common boundary between formulations, and bond together at any common boundary between a formulation and the membrane. The method may include the further step of changing to the orientation of the membrane cavity to thereby affect the flow of one or more formulations and determine the shape of the foam region subsequently formed thereby.

9 Claims, 3 Drawing Sheets

U.S. Patent   Jul. 5, 1988   Sheet 1 of 3   4,755,411
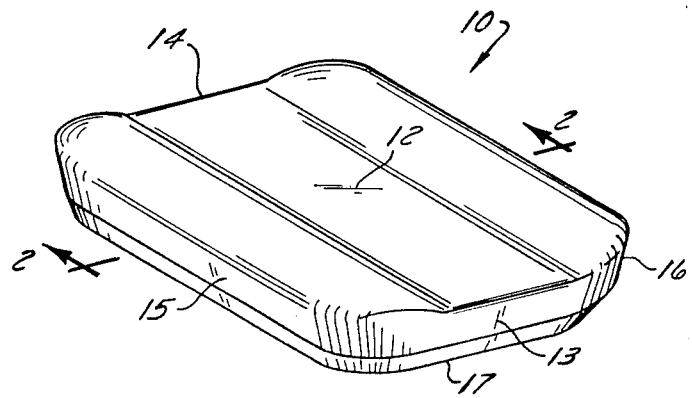
FIG. 1
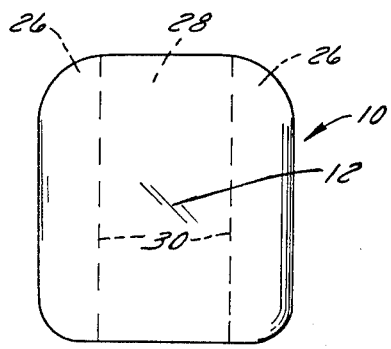
FIG. 3
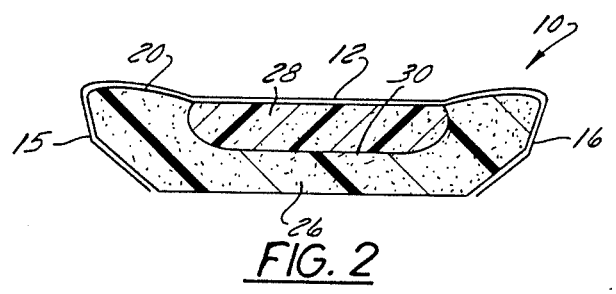
FIG. 2
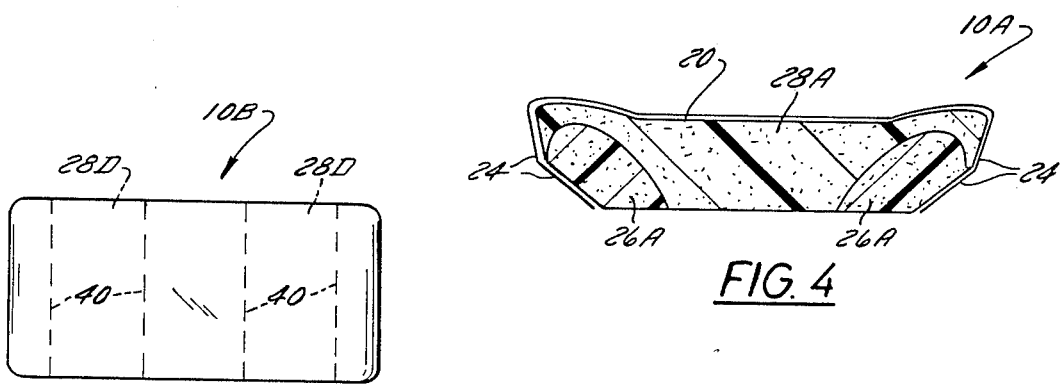
FIG. 4
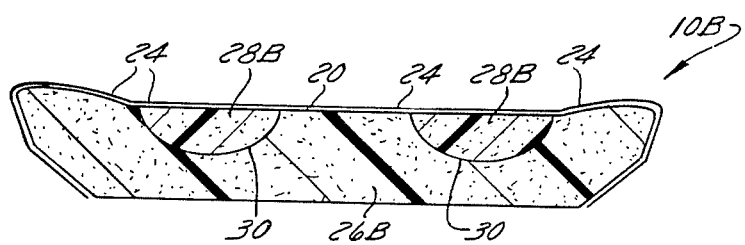
FIG. 6
FIG. 5

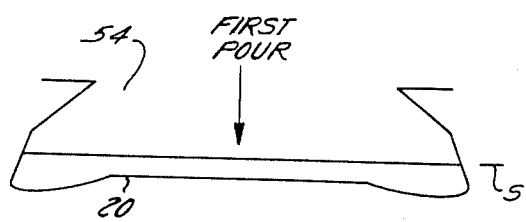
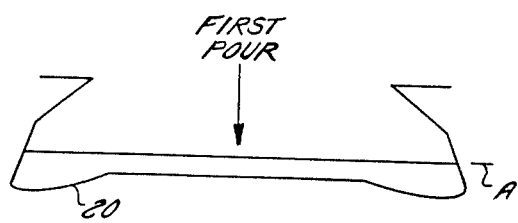
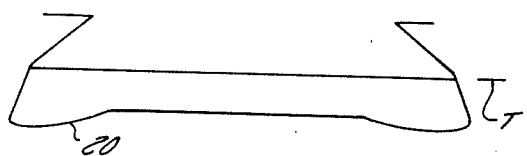
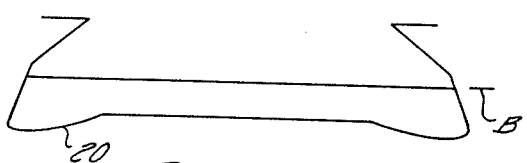
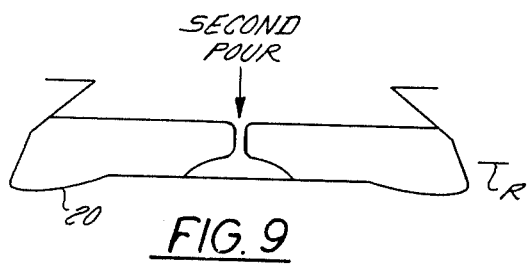
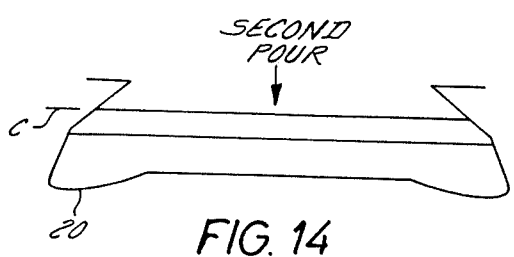
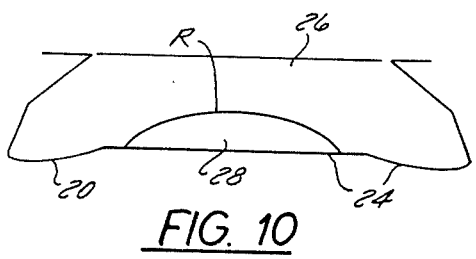
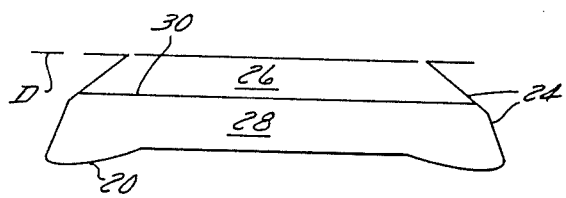
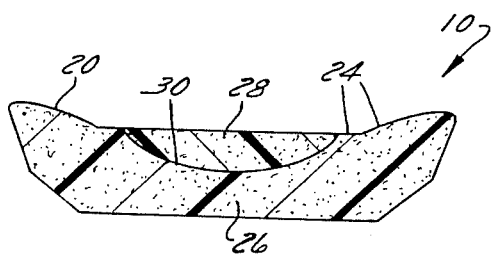
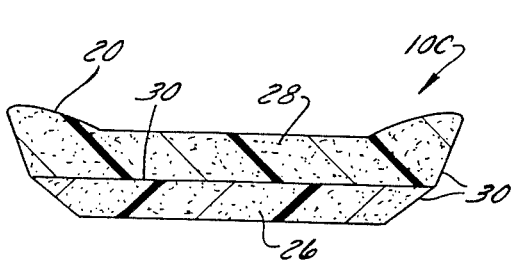

CUSHION HAVING FLEXIBLE OUTER MEMBRANE AND MULTI-DENSITY RESILIENT FOAM MEMBER THEREIN

BACKGROUND OF THE INVENTION

1. Field of Use

This invention relates to a cushion comprising a flexible outer membrane and a multi-density or multi-hardness foam member underlying and bonded to the membrane and to methods for making such a cushion.

2. Description of the Prior Art

U.S. Pat. No. 4,405,681 and No. 4,190,697, both assigned to the same assignee as the present application, disclose and claim multi-density foam articles and methods for making such articles. Typically, after such multi-density foam articles are made, they are then provided with flexible outer covers, made of cloth, plastic, leather or the like, which are then glued to the foam articles and thus fashioned into cushions, such as seat cushions, for motor vehicles, such as cars, trucks, motorcycles or the like, or for furniture. In some other prior art arrangements, cushions are made by gluing together pre-formed foam blocks of different hardness or compressibility and then gluing a flexible covering therearound.

SUMMARY OF THE PRESENT INVENTION

The present invention provides an improved cushion, such as a seat cushion for motor vehicles or furniture, which comprises a flexible outer membrane or cover and a multi-density or multi-hardness foam member, comprising foam regions of different density, hardness or compressibility which are bonded together and underly or are covered by the membrane and bonded to the membrane, such bonding occurring during formulation of the foam member and employing the materials of which the foam member is made. The present invention also provides improved methods for making such cushions.

In the improved cushion, the foam member comprises a plurality of foam regions of different density, hardness or compressbility, which regions are bonded together at their common boundaries by the materials of which the foam regions are made. The foam regions are made from liquid formulations similar to those described in detail in U.S. Pat. Nos. 4,405,681 and 4,190,697, hereinbefore referred to. The cushion further comprises a flexible outer membrane or cover which is bonded to a foam region at any common boundary therewith by the material of which that foam region is made. The plurality of foam regions include at least one foam region made of a material which, when creamed, risen and cured, provides a foam region having a greater density, hardness or resistance to compressibility than at least one other foam region so that one foam region is relatively "hard" and the other foam region is relatively "soft". Typically, the cushion, when finished, comprises an upper or front side defined by a portion of the flexible membrane, and the relatively soft foam region is disposed at the upper or front side of the cushion between the membrane and the relatively hard foam region of the foam article. However, a reverse arrangement is possible, as where the cushion, when finished, comprises an upper or front side defined by a portion of the flexible membrane, and the relatively hard foam region of the foam article is disposed at the upper or front side of the cushion between the membrane and the relatively soft foam region of the foam article. Furthermore, a cushion in accordance with the invention can embody a foam article having more than two foam regions of different hardness and these regions can be disposed in various arrangements with respect to one another and with respect to said membrane.

In each of the improved methods herein disclosed, there is provided a flexible outer membrane which becomes part of the cushion and which may be made of plastic, cloth, leather, similar materials, or combinations thereof. The flexible outer membrane is disposed so that it defines one or more membrane cavities into which liquid formulations, hereafter described, can be poured. The membrane can be pre-formed to and maintained in a desired shape or contour, or disposed in a mold cavity in a mold which maintains it in a desired shape or contour. Then, a plurality of formulations in liquid form, each of which will ultimately yield a foam region of a desired density or hardness, are poured in some predetermined sequence into the cavity or cavities in the membrane. When all formulations have been poured, allowed to cream and rise to a desired extent, they are then allowed to cure and in doing so bond together at common boundaries between foam regions and also at common boundaries between a foam region and the membrane.

In those methods wherein the membrane is disposed in the mold, either gravity alone can be relied on to cause the membrane to assume the contour of the mold cavity, or the membrane may be forcibly fitted therein (manually or by a die) or the space between the membrane and walls of the mold cavity can be subjected to low air pressure (vacuum) to positively cause the membrane to assume the contour of the mold cavity, assuming that the membrane porosity is selected to permit this.

Furthermore, the orientation of the membrane cavity may be changed before, while, or after a particular formulation is poured into the membrane cavity to thus control the flow of any or all of the formulations and thereby determine the location and/or shape of the foam regions in the finished cushion.

If a pre-formed membrane is not disposed in a mold when a liquid formulation is poured thereinto, the flexible membrane must be fabricated of substantially liquid impervious material to prevent leakage of the liquid formulation therethrough before it cures.

If the membrane is disposed in a mold and low air pressure (vacuum) is relied on to maintain it in conformity with the mold cavity shape, then the membrane must be fabricated of material which is sufficiently fluid impervious to prevent leakage and to enable the membrane to conform to the mold cavity shape or contour under low pressure conditions.

The improved cushions and improved methods offer numerous advantages over the prior art. For example, in the cushion, each foam region in the foam member is bonded at any common boundary with another foam region and is also bonded to any common boundary it may have with the flexible membrane. The bonds employ the same material of which a foam region is made. Therefore, no separate adhesives need be employed or applied to join foam regions together or to join them to the membrane. Thus, the finished cushion is a strong, coherent, integral product, Furthermore, numerous costly manufacturing steps employed to manufacture prior art cushions, such as fitting and gluing foam blocks and covers, are eliminated. Customized cushions are easy to provide because the various foam regions can be disposed as desired relative to the flexible membrane and in any desired order or arrangement. Changing the orientation of the cavity as formulations are poured, or while one or more formulations is still in a flowable state, enables shaping and positioning of one or more foam regions to suit the requirements of a particular cushion.

Other objects and advantages of the invention will hereinafter appear.

DRAWINGS

FIG. 1 is a perspective view of a cushion in accordance with a first embodiment of the invention;

FIG. 2 is a cross-section view taken on line 2—2 of FIG. 1;

FIG. 3 is a top plan view of the cushion shown in FIGS. 1 and 2;

FIG. 4 is a cross-section view of a cushion in accordance with a second embodiment of the invention;

FIG. 5 is a cross-section view of a cushion in accordance with a third embodiment of the invention;

FIG. 6 is a top plan view of the cushion shown in FIG. 5;

FIGS. 7 through 11 are cross-section views in schematic form showing a series of method steps in accordance with one aspect of the invention;

FIGS. 12 through 16 are cross-section views in schematic form showing a series of method steps in accordance with another aspect of the invention;

DESCRIPTION OF PREFERRED EMBODIMENTS

Cushions

Figure 17:
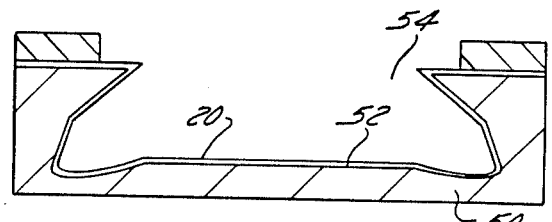
FIG. 17 is a cross-section view of a mold usable in practicing the invention.

FIG. 1 is a perspective view of a finished cushion 10 in accordance with the invention which, for example, could be used as a seat cushion or a backrest cushion, depending on its orientation, but is shown disposed as a seat cushion so as to present an upper side 12, a front side 13, a rear side 14, a pair of opposite lateral sides 15 and 16, and a bottom side 17. Upper side 12 of seat cushion 10 would correspond to a front side 12, if cushion 10 were used a backrest cushion.

The cross-section view in FIG. 2 shows that cushion 10 comprises an outer cover in the form of a flexible membrane 20 and a foam article 22 disposed within and bonded, as at 24, to the flexible membrane. Flexible membrane 20 may take the form of a sheet of plastic, cloth fabric, cloth coated with plastic, leather, combinations of these materials, or the like. Foam article 20 comprises a plurality of foam regions 26 and 28 of different foam density, hardness or compressibility. The foam regions 26 and 28 are bonded together at any common boundary therebetween, as at boundary 30, by the materials of which the foam regions are made. Each of the foam regions 26 and 28 is bonded at any common boundary, such as boundary 24, between each foam region and flexible membrane 20 by the material of which that foam region is made. Foam region 26 is understood to be relatively hard and foam region 28 is understood to be relatively soft.

FIG. 3 is a top plan view of cushion 10 shown in FIGS. 1 and 2 and shows, for example, a typical position of soft foam region 28, i.e., at the middle of the upper side 12 of cushion 10 between two dashed boundary lines 30.

FIG. 4 is a cross-section view of another cushion 10A wherein a foam region 28A underlying substantially all of membrane 20 is soft and the two spaced apart foam regions 26A near the lateral sides of the cushion are hard.

Figure 23:
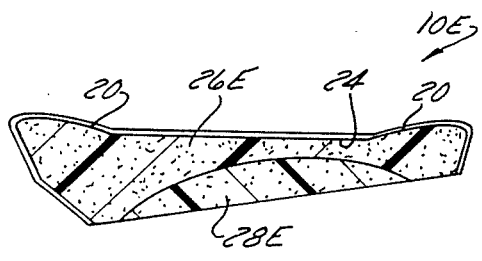
FIG. 23 is a longitudinal cross-section view of a cushion made in accordance with a variation of the method generally depicted, in FIGS. 19 through 21 and FIGS. 7 through 10.
Figure 22:
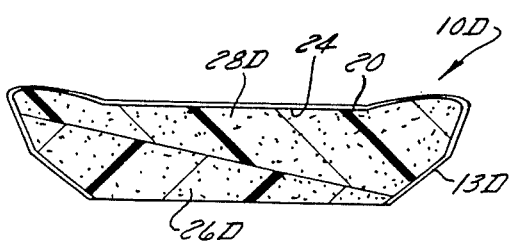
FIG. 22 is a cross-section view of a product made by the method of FIG. 21.

FIG. 5 is a cross-section view of another cushion 10B wherein two spaced apart foam regions 28B underlying membrane 20 at the upper side of the cushion are soft and wherein an underlying foam region 26B is hard. FIG. 6 is a top plan view of cushion 10B and shows, for example, typical positioning of the two spaced apart soft regions 28B at the upper side of cushion 10B, i.e., each region 28B between a pair of dashed boundary lines 40. FIGS. 16, 22 and 23 show other cushions designated 10C, 10D and 10E, respectively.

As will be understood, a cushion in accordance with the invention could embody any desired arrangement of discrete hard and soft foam regions. Furthermore, a cushion could embody more than two foam regions which differ from one another as regards relative foam density, hardness or compressibility.

Method

The general method of making a cushion comprising a flexible membrane or cover and a foam article having foam regions of different foam density, hardness or compressibility bonded to the membrane, comprises the steps of:

(a) providing a flexible membrane having a membrane cavity therein;

(b) adding to the membrane cavity in a predetermined sequence a plurality of formulations in liquid form which, when completely foamed and cured, provide a foam article having foam regions of different density, hardness or compressibility;

(c) allowing each liquid formulation to cream, foam and rise to a desired extent before or during pouring of a subsequent formulation;

(d) and allowing the formulations to cure and bond together at any common boundary between formulations, and bond together at any common boundary between a formulation and the membrane.

Figure 18:
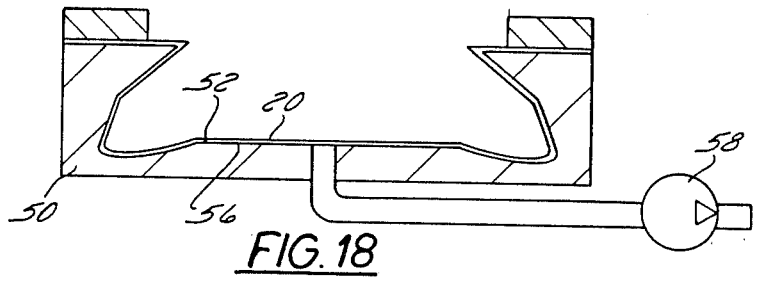
FIG. 18 is a cross-section view of another type of mold usable in practicing the invention.

It is preferred, as shown in FIG. 17, that flexible membrane 20 be disposed in a mold 50 and conformed to the shape of the mold cavity 52 so that the membrane defines a membrane cavity 54 which is adapted to receive the formulations which are poured thereinto to form a foam article such as 22. Membrane 20 can be conformed to the shape of mold cavity 52 by gravity, or manually or by a die, or, as shown in FIG. 18, by evacuation of air from the space 56 between membrane 20 and mold cavity 52 by means of a vacuum pump 58 connected to space 56.

However, it is within the scope of the present invention to use a flexible membrane 20 which is pre-formed, or secured in such a manner, as to define one or more membrane cavities 54 and which does not require a mold 50 for cavity definition and/or membrane support.

All methods disclosed herein require the use of at least two formulations that can be of the type disclosed in detail in U.S. Pat. Nos. 4,405,681 and 4,190,697, hereinbefore referred to. For purposes of the following discussion, it is sufficient to note that each of the plurality of formulations used in the present invention has the following properties:

1. initially it is in a liquid form or state;
2. it has a predetermined known specific gravity when liquid;
3. it starts to cream and rise upon being poured into membrane cavity 54 and in that condition has a lower specific gravity than when in its liquid state;
4. it becomes fully expanded and cured;
5. it is adhesive or "tacky" while creaming and rising and before it is cured, and will adhere to any contiguous formulation in the same state and will adhere to any contiguous membrane surface;
6. it provides, when cured, a foam region which has a predetermined foam density, hardness or compressibility (which can be characterized as relatively hard or soft), as compared to the foam regions formed by the other formulations;
7. it is mechanically bonded, when cured, to any contiguous foam region or contiguous membrane surface.

The cushion 10 shown in FIGS. 1, 2 and 3 can be made by a method depicted in FIGS. 7-11. A cushion 10E (FIG. 16) can be made by another method depicted in FIGS. 12-16. Both methods presuppose the use of one formulation which produces a "hard" foam region 26 and another formulation which produces a "soft" foam region 28.

Referring to the first method depicted in FIGS. 7 through 11, assume that flexible membrane 20 is disposed (in mold 50 or otherwise) so as to provide a membrane cavity 54. The formulation which will provide a hard foam region is poured as a liquid into cavity 54 to some level S (FIG. 7) and allowed to partially cream and rise to some level T (FIG. 8). Referring to FIG. 9, then, the other formulation which will provide a soft foam region is poured in liquid form into cavity 54 and, because its specific gravity as liquid is greater than that of the partially creamed first-poured formulation, it passes therethrough to the bottom of cavity 54, filling to some level R, and the partially creamed first formulation floats thereon. Referring to FIG. 10, the second-poured formulation is allowed to cream and rise. After sufficient time has elapsed, both formulations have risen fully, are cured, and are bonded together at their common interface 30 and are also bonded to membrane 20 at 24 at any interface therewith. Referring to FIG. 11, the finished cushion 10 (after removal from mold 50, if used) is inverted and seen to comprise membrane 20, soft foam region 28 at the top of cushion 10 and hard foam region 26 therebelow.

It is to be understood that cushion 10B, which may be a seat designed for use by two persons, shown in FIGS. 5 and 6, is made in a manner similar to that described immediately above. However, in the case of cushion 10B, the liquid which will form the two spaced apart soft regions 28B is poured into cavity 54 at two spaced apart locations after the first-poured liquid has partially creamed and risen.

It is to be understood that cushion 10A, shown in FIG. 4, is made in a manner similar to that above described. However, in the case of cushion 10A, the liquid which will form the two spaced apart hard regions 26A is poured into cavity 54 at two spaced apart locations as the first-poured liquid.

The second method depicted in FIGS. 12 through 16 for making cushion 10C will now be described. Referring to FIG. 12, assume that flexible membrane 20 is disposed (in mold 50 or otherwise) so as to provide a membrane cavity 54. Then, a formulation which will provide a soft foam region is poured in liquid form into cavity 54 to a level A and allowed to cream and rise to some level B (FIG. 13) and partially cure. Referring to FIG. 14, another formulation which will provide a hard foam region is poured in liquid form into cavity 54 to some level C. Since the second pour cannot pass through the partially cured first pour, the second pour will float on the partially cured first pour and is allowed to cream and rise to some level D (FIG. 15). Referring to FIG. 15, both formulations are allowed to rise fully and to cure fully. After fully curing the two foam regions bond together at their common interface 30 and to membrane 20 at 24. Referring to FIG. 16, the finished cushion 10C (after removal from mold 50, if used) is inverted and seen to comprise membrane 20, soft foam region 28 at the top of cushion 10 and hard foam region 26 therebelow, not necessarily limited to the full width of the cushion.

Referring to FIGS. 19 through 23, methods will now be described which involve changing the orientation of membrane cavity 54 while one or more formulations in the membrane cavity 54 is still in a flowable state (i.e., still liquid or partially creamed) and maintaining a chosen orientation until the flowable state changes to a non-flowable state, as when partially cured, to thereby control or determine the shape of the entire foam member or the shape and/or location of one or more of the foamed regions in the foam member relative to other regions or relative to the membrane.

To make a cushion such as 10D, shown in FIG. 22, which comprises a flexible membrane 20 and a foam member comprising a soft upper foam region 28D and a hard lower foam region 26D which slopes upwardly toward the front side 17D of cushion 10D, the steps are as follows.

Figure 19:
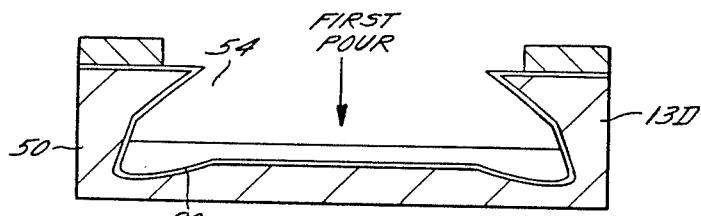
FIGS. 19 through 21 are cross-section views in schematic form showing a series of method steps in accordance with still another aspect of the invention.

As FIG. 19 shows, membrane 20 is disposed in mold 50 so that its membrane cavity 54 has a certain orientation. Then, a formulation which will provide a soft foam region 28D is poured as a liquid into membrane cavity 54. Either prior to, during or shortly after such pouring, while the formulation is still flowable, membrane 20 is tilted (as by tilting mold 50) so as to change the orientation of membrane cavity 54 to that shown in FIG. 20, for example, and so that the formulation assumes the position relative to the membrane 20 shown in FIG. 20. It is to be understood in this example that the numeral 13D in FIGS. 19-22 designates what will be the front side of cushion 10D. The first formulation is allowed to cream and rise while the membrane cavity 54 is in the position shown in FIG. 20 and is allowed to cure to the extent that the next formulation poured in cavity 54 will not penetrate the first pour. Then, the orientation of cavity 54 is returned, for example, to that shown in FIG. 21, and the second formulation is poured into cavity 54 and allowed to cream, rise and cure. When both formulations are fully cured, the cushion 10D is removed from mold 50 and inverted, as shown in FIG. 22.

It will be apparent from the immediately preceding description that the pouring sequence, except for twice changing the orientation of membrane cavity 54, is the same as that generally described hereinbefore in connection with FIGS. 12-16.

Figure 20:
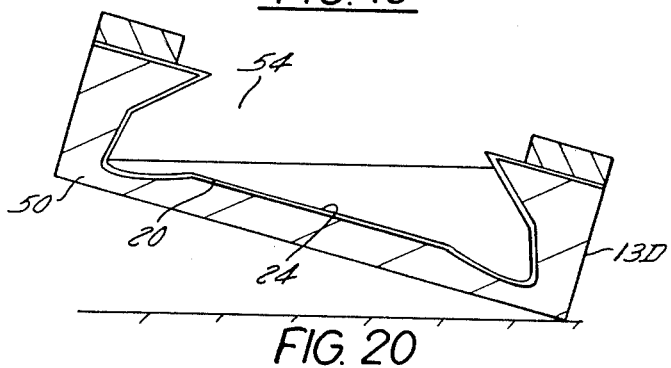
Figure 21:
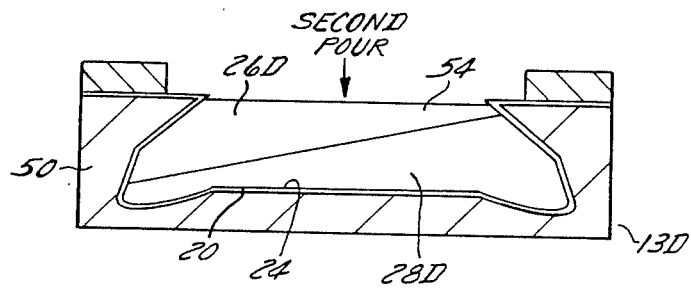

It is to be understood that the cavity 54 orientation sequence shown in FIGS. 19-21 could also be employed with the pouring sequence described in connection with FIGS. 7-11, provided that the cavity 54 is maintained in the orientation shown in FIG. 20 until both formulations cream, rise and cure. In such cases, a cushion 10E would have a longitudinal cross-section such as shown in FIG. 23.

It is possible to dispose the cavity 54 in any fixed orientation before the formulations are poured and to maintain it in that orientation during creaming, rising and curing. This will provide positioning of the foam regions and to shorten pour time.

We claim:

1. A cushion comprising:
   a flexible membrane;
   and a foam article bonded to said flexible membrane, said foam article comprising a plurality of foam regions of different relative hardness,
   said foam regions being bonded together at any common boundary therebetween by materials of which said foam regions are made,
   each of said foam regions being bonded at any common boundary between that foam region and said flexible membrane by the material of which said foam region is made.

2. A cushion according to claim 1 wherein said plurality of foam regions include at least one relatively hard foam region and at least one relatively soft foam region.

3. A cushion according to claim 2 which comprises a side defined by a portion of said flexible membrane, and wherein said one relatively soft foam region is disposed between said membrane at said side and said one relatively hard foam region.

4. A cushion according to claim 3 which comprises a plurality of spaced apart relatively soft foam regions which are disposed between said membrane at said side and a relatively hard foam region.

5. A cushion according to claim 1 which comprises a front or upper side and lateral sides defined by said flexible membrane, at least one relatively soft foam region disposed at said front or upper side, and a plurality of spaced apart relatively hard foam regions embedded within said soft foam region near said lateral sides of said cushion.

6. A cushion according to claim 2 which comprises a side defined by a portion of said flexible membrane, and wherein said one relatively hard foam region is disposed between said membrane at said side and said one relatively soft foam region.

7. A cushion according to claim 2 wherein said cushion comprises an upper side, a pair of lateral sides, a front side, a rear side, and a bottom side,
   each of said upper, lateral, front and rear sides being defined by said flexible membrane,
   said upper side having a center section extending in one direction between said front side and said rear side and extending transversely to said one direction between but spaced from said lateral sides,
   said upper side having side sections between said center section and said lateral sides of said cushion,
   wherein said relatively soft foam region is disposed between said membrane at said center section of said upper side of said cushion and said relatively hard foam region,
   and wherein said relatively hard foam region is disposed between said membrane at said front side and said rear side of said cushion, between said membrane at said lateral sides of said cushion, and between said membrane at said side sections and said bottom side of said cushion.

8. A cushion according to claim 2 wherein said cushion comprises an upper side, a pair of lateral sides, a front side, a rear side, and a bottom side, each of said upper, lateral, front and rear sides being defined by said flexible membrane,
   said upper side having a center section extending in one direction between said front side and said rear side and extending transversely to said one direction between but spaced from said lateral sides,
   said upper side having side sections between said center section and said lateral sides of said cushion which extend upwardly from said upper side,
   wherein said relatively soft foam region is disposed between said membrane at said center section of said upper side of said cushion and said bottom side of said cushion,
   wherein said relatively soft foam region is also disposed between said membrane at said front side an said rear side of said cushion,
   wherein a relatively hard foam region is disposed between said membrane at each of said upwardly extending side sections and said membrane at an associated lateral side of said cushion but does not contact said membrane,
   wherein said relatively soft foam region is further disposed between said membrane at each of said upwardly extending side sections and an associated one of said relatively hard foam regions,
   and wherein said relatively soft foam region is additionally disposed between said membrane at a lateral side of said cushion and an associated relatively hard foam region.

9. A cushion according to claim 2 wherein said cushion comprises an upper side, a pair of lateral sides, a front side, a rear side, and a bottom side, each of said upper, lateral, front and rear sides being defined by said flexible membrane,
   wherein said upper side has two laterally spaced apart center sections, each center section extending in one direction between said front side an said rear side and extending transversely to said one direction between but spaced from said lateral sides,
   wherein said cushion comprises two discrete relatively soft foam regions, each of which is disposed between said membrane at a center section of said upper side of said cushion and said relatively hard foam region,
   and wherein said relatively hard foam region is disposed between said membrane at said front side and said rear side of said cushion, between said membrane at said lateral sides of said cushion, and between said bottom side of said cushion and said two relatively soft foam regions and said membrane at said upper side of said cushion extraneously of said two center sections.

* * * * *